US005436288A

United States Patent [19]

Takahashi et al.

[11] Patent Number: 5,436,288
[45] Date of Patent: Jul. 25, 1995

[54] CONDUCTIVE SILICONE RUBBER COMPOSITION AND CONDUCTIVE SILICONE RUBBER

[75] Inventors: Masaharu Takahashi; Tomiyoshi Tsuchida, both of Annaka, Japan

[73] Assignee: Shin-Etsu Chemical Co., Ltd., Tokyo, Japan

[21] Appl. No.: 915,176

[22] Filed: Jul. 20, 1992

[30] Foreign Application Priority Data

Jul. 18, 1991 [JP] Japan .................................. 3-203905

[51] Int. Cl.$^6$ .......................... C08K 5/09; C08L 83/06
[52] U.S. Cl. ...................... 524/300; 524/322; 524/495; 524/588; 524/773; 524/847; 524/860; 252/511
[58] Field of Search ................ 252/511; 524/588, 495, 524/300, 322, 860, 847, 773

[56] References Cited

U.S. PATENT DOCUMENTS

| | | | |
|---|---|---|---|
| 4,310,444 | 1/1982 | Hamada et al. | 524/588 |
| 4,657,965 | 4/1987 | Watanabe et al. | 524/588 |
| 4,714,734 | 12/1987 | Hashimoto et al. | 524/860 |
| 4,771,099 | 9/1988 | Itoh et al. | 524/862 |
| 5,051,465 | 9/1991 | Yoshida et al. | 524/860 |
| 5,164,442 | 11/1992 | Itoh et al. | 524/588 |
| 5,294,373 | 3/1994 | Takahashi et al. | 525/474 |

FOREIGN PATENT DOCUMENTS

| | | |
|---|---|---|
| 0493112 | 7/1992 | European Pat. Off. . |
| 957108 | 5/1964 | United Kingdom . |
| 1178255 | 1/1970 | United Kingdom . |

*Primary Examiner*—Melvyn I. Marquis
*Assistant Examiner*—Karen A. Dean
*Attorney, Agent, or Firm*—Millen, White, Zelano, & Branigan

[57] ABSTRACT

A conductive silicone rubber composition comprising (A) an organopolysiloxane, (B) conductive carbon black, and (C) an organic peroxide is improved in shelf stability by adding (D) a fatty acid or an acid anhydride thereto. The composition is subject to atmospheric hot air vulcanization to form a conductive silicone rubber having improved conductivity and physical properties.

18 Claims, No Drawings

CONDUCTIVE SILICONE RUBBER COMPOSITION AND CONDUCTIVE SILICONE RUBBER

This invention relates to a conductive silicone rubber composition containing conductive carbon black and a conductive silicone rubber obtained by curing the composition. More particularly, it relates to a conductive silicone rubber Composition which can be cured into satisfactory rubber products by atmospheric hot air vulcanization (HAV) techniques. As used herein, the term conductive refers to electrical conductivity.

BACKGROUND OF THE INVENTION

Most rubbery materials are electric insulators. A number of conductive rubbers are available as mixtures of rubbery material and conductive agents. For example, rubbers having carbon black blended therein to provide an electric resistivity of from 10 to $10^5$ Ω-cm are conductive rubbers which are used in various applications.

Silicone rubber is also widely used as electrically insulating rubber because of its heat resistance, low-temperature resistance and weatherability. It can also be used as conductive silicone rubber by adding conductive agents like the other rubbery materials.

The conductive agents which are added to silicone rubber for imparting electric conductivity are typically carbon black, graphite, various metal powders such as silver, nickel, and copper, various non-conductive particles and monofilaments surface treated with silver or similar metals, carbon fibers, and metallic fibers. By mixing these conductive agents, the volume resistivity of silicone rubber can be reduced to the order of $10^{10}$ to $10^{-3}$ Ω-cm depending on the type and amount of conductive agent without detracting from the inherent properties of silicone rubber. Particularly when highly conductive silicone rubbers having a resistivity of about $10^5$ Ω-cm or lower are desired, carbon black and metal powders such as silver and nickel are used, with carbon black being often used in view of cost.

However, when a silicone rubber composition having conductive carbon black such as acetylene black blended therein is molded and processed into a length of article such as sealing members, gaskets, and rolls as by extrusion molding followed by vulcanization, strict limits are imposed on the vulcanization system.

More particularly, in the case of organic peroxide vulcanization, for example, acyl peroxides such as benzoyl peroxide and 2,4-dichlorobenzoyl peroxide are commonly used with silicone rubber compositions for enabling HAV. However, when such acyl peroxides are added to silicone rubber systems containing carbon black, the carbon black retards vulcanization, failing to provide satisfactory molded products. Other useful vulcanization agents are alkyl peroxides such as dicumyl peroxide and di-t-butyl peroxide. When such alkyl peroxides are added to silicone rubber systems containing carbon black, the systems can be compression molded. In the case of extrusion atmospheric hot air vulcanization, however, the same systems fail to provide satisfactory products because of the influence of oxygen in air resulting in short surface vulcanization.

For extrusion HAV of carbon black-loaded silicone rubber compositions, a common prior art approach to avoid such difficulty is by addition vulcanization. In accordance with this approach, an organopolysiloxane containing an alkenyl group is cured by adding thereto an organohydrogenpolysiloxane having a silicon-attached hydrogen atom capable of addition reaction with the alkenyl group and a platinum series addition reaction catalyst. This addition reaction system, however, suffers from serious problems associated with molding since it is limited in shelf life and can be prevented from curing by poisons such as amines, sulfur and tin.

In molding conductive silicone rubbers into electromagnetic radiation shielding gaskets, building gaskets, business machine use conductive rolls (such as electrostatic rolls, transfer rolls, developing rolls, paper feed rolls, and fixing rolls), and conductive calendered stocks to be shaped into zebra connectors, the molding process in accordance with the conventional HAV is disadvantageous in moldability and product quality.

To overcome these problems, the inventors previously proposed Japanese Patent Application No. 416974/1990 or U.S. patent application Ser. No. 07/812,285, now U.S. Pat. No. 5,299,573, or European Patent Application No. 92312013.5 which claims a conductive silicone rubber composition comprising (A) an organopolysiloxane of the general formula (1):

$$R_a^1 SiO_{(4-a)/2} \qquad (1)$$

wherein $R^1$ is independently selected from substituted or unsubstituted monovalent hydrocarbon groups and letter a is a positive number of 1.90 to 2.05, (B) conductive carbon black, and (C) an organic peroxide of the general formula (2):

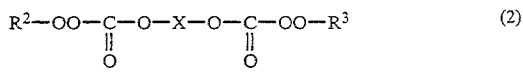

$$R^2-OO-\underset{O}{\underset{\|}{C}}-O-X-O-\underset{O}{\underset{\|}{C}}-OO-R^3 \qquad (2)$$

wherein X is a group of the following formula (3) or (4):

$$-(CH_2)_n- \qquad (3)$$

$$-CH_2-\underset{\underset{CH_3}{|}}{\overset{\overset{CH_3}{|}}{C}}-CH_2- \qquad (4)$$

wherein n is an integer of 2 to 8, $R^2$ and $R^3$ are each a monovalent hydrocarbon group having 3 to 10 carbon atoms or a group of the following formula (5):

$$-SiR_3^4 \qquad (5)$$

wherein $R^4$ is a methyl, ethyl or phenyl group.

This conductive silicone rubber composition can be satisfactorily molded and vulcanized by extrusion molding or calendering followed by HAV, offering conductive silicone rubber having improved physical properties.

Continuing research works, we found that the above-defined conductive silicone rubber composition exhibited satisfactory physical properties and workability immediately after its preparation, but with the lapse of time, experienced an increase of plasticity and scorching phenomenon. There is a need for increasing the shelf stability of such a composition.

SUMMARY OF THE INVENTION

Therefore, an object of the present invention is to provide a novel and improved conductive silicone rubber composition which can be molded and vulcanized into conductive silicone rubber having satisfactory physical properties by extrusion molding or calendering and HAV techniques. Another object of the present invention is to provide such a conductive silicone rubber composition having improved shelf stability. A further object is to provide a novel and improved conductive silicone rubber.

We have found that the conductive silicon rubber composition of the above-said Patent Application can be improved by blending it with formic acid or at least one additive selected from a fatty acid of the following general formula (6):

$$R^5(COOH)_m \qquad (6)$$

wherein $R^5$ is a saturated or unsaturated, substituted or unsubstituted, monovalent hydrocarbon group having 1 to 30 carbon atoms and m is an integer of 1 to 10, an acid anhydride resulting from molecular condensation of the fatty acid, or an acid anhydride of the general formula (7):

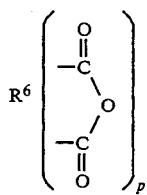

(7)

wherein $R^6$ is a saturated or unsaturated, substituted or unsubstituted, polyvalent hydrocarbon group having 1 to 30 carbon atoms and p is an integer of 1 to 3. The resulting composition exhibits high shelf stability over a long time while maintaining the advantages of the composition of the above-said Patent Application.

More particularly, a conductive silicone rubber composition having blended an organopolysiloxane of formula (1), conductive carbon black, an organic peroxide of formula (2), and formic acid or a fatty acid of formula (6) or an acid anhydride thereof or an acid anhydride of formula (7) can be satisfactorily vulcanized by atmospheric hot air vulcanization (HAV) or UHF-assisted vulcanization during extrusion molding or calendering because despite of the inclusion of conductive carbon black, the organic peroxide of formula (2) is not affected by the carbon black. Since the composition can be vulcanized without resorting to addition vulcanization, it eliminates the risk of catalyst poisoning and is easy to handle. The composition is well moldable, experiences little change of plasticity and no scorching with time, and always remains workable over a long time. Moreover, the cured silicone rubber has appropriate conductivity and good physical properties and presents a tack-free surface.

Accordingly, the present invention provides a conductive silicone rubber composition comprising (A) an organopolysiloxane of formula (1), (B) conductive carbon black, (C) an organic peroxide of formula (2), and (D) formic acid or a fatty acid of formula (6), an acid anhydride resulting from molecular condensation of the fatty acid or an acid anhydride of formula (7).

DETAILED DESCRIPTION OF THE INVENTION

Component (A) of the conductive silicone rubber composition according to the present invention is an organopolysiloxane of the general formula (1).

$$R^1_a SiO_{(4-a)/2} \qquad (1)$$

In formula (1), $R^1$ which may be identical or different is selected from substituted or unsubstituted monovalent hydrocarbon groups preferably having 1 to 12 carbon atoms, more preferably 1 to 6 carbon atoms and letter a is a positive number of 1.90 to 2.05. Examples of the monovalent hydrocarbon group include alkyl groups such as methyl, ethyl, propyl and butyl groups; alkenyl groups such as vinyl, allyl and butenyl groups; aryl groups such as phenyl and tolyl groups; and substituted ones of these groups wherein some or all of the hydrogen atoms attached to carbon atoms are replaced by halogen atoms, cyano groups or the like, such as chloromethyl, chloropropyl, 3,3,3-trifluoropropyl and 2-cyanoethyl groups.

These organopolysiloxanes should preferably have a linear molecular structure although a partially branched structure is acceptable. The organopolysiloxanes are often blocked with a triorganosilyl or hydroxyl group at the end of their molecular chain. Examples of the triorganosilyl group include trimethylsilyl, dimethylvinylsilyl, methylphenylvinylsilyl, methyldiphenylsilyl, methyldivinylsilyl, and trivinylsilyl groups. For further reducing surface tack, organopolysiloxanes blocked with a polyfunctional group such as $(CH_2=CH)_2RSi-$ and $(CH_2=CH)_3Si-$ wherein R has the same meaning as $R^1$ at either end of their molecular chain are preferred. The organopolysiloxanes should preferably have a viscosity of at least 300 centistokes (cs) at 25° C. although the degree of polymerization is not critical.

Component (B) is electroconductive carbon black which may be selected from various types of conductive carbon black commonly used in conductive rubber compositions. Examples include acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black includes Denka Acetylene Black manufactured by Denki Kagaku K.K., Shawinigan Acetylene Black manufactured by Shawinigan Chemical Co., the conducting furnace black includes Continex CF manufactured by Continental Carbon Co. and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International. Preferred among others is acetylene black because it is more conductive due to a reduced impurity content and a well developed secondary structure. Also, Ketjen Black EC and Ketjen Black EC-600JD are useful because they have an extremely increased specific surface area so that sufficient conductivity is accomplished with a low loading.

The conductive carbon black may be used alone or in admixture of two or more types, preferably in an amount of from 5 to 100 parts, more preferably from 10 to 70 parts by weight per 100 parts by weight of organopolysiloxane (A). Less than 5 parts of carbon black would sometimes fail to provide desired electric conduction whereas more than 100 parts of carbon black would sometimes result in cured products having low mechanical strength.

Component (C) is an organic peroxide of the general formula (2).

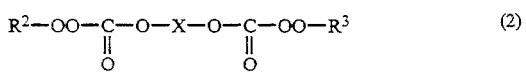

In formula (2), X is a group of formula (3):

wherein n is an integer of 2 to 8 or a group of formula (4):

In formula (2), $R^2$ and $R^3$ which may be identical or different are a monovalent hydrocarbon group having 3 to 10 carbon atoms such as, for example, n-propyl, isopropyl, t-butyl, n-butyl, n-amyl, hexyl, heptyl, octyl, 2-ethylpropyl, 2-ethylbutyl, 2-ethylhexyl, and cumyl groups or a trimethylsilyl, triethylsilyl or triphenylsilyl group of the following formula (5):

$$-SiR_3^4 \qquad (5)$$

wherein $R^4$ is a methyl, ethyl or phenyl group.

The organic peroxide (C) is effective as a vulcanizing agent for organopolysiloxane (A) and preferably blended in an amount of about 0.1 to 5 parts, more preferably about 0.5 to 3 parts by weight per 100 parts by weight of organopolysiloxane (A). Often less than 0.1 parts of the organic peroxide would be less effective for vulcanization, resulting in cured products which are practically unacceptable because of poor properties. More than 5 parts of the organic peroxide would sometimes adversely affect the composition due to excess decomposition residue and be less cost effective.

In addition to the above-mentioned components (A) to (C), the conductive silicone rubber composition of the present invention has (D) at least one additive selected from the group consisting of formic acid, a fatty acid of formula (6), an acid anhydride resulting from molecular condensation of the fatty acid, and an acid anhydride of formula (7) blended therein for further improving shelf stability.

$$R^5(COOH)_m \qquad (6)$$

In formula (6), $R^5$ is saturated or unsaturated, substituted or unsubstituted, monovalent hydrocarbon group having 1 to 30 carbon atoms, preferably 5 to 20 carbon atoms such as, for example, octyl, nonyl, lauryl, cetyl, stearyl, and behenyl groups, and m is an integer of 1 to 10, preferably 1 to 5.

Examples of the fatty acid of formula (6) include acetic acid, propionic acid, lauric acid, stearic acid, ricinoleic acid, naphthenic acid, 2-ethylhexoylic acid. Acetic anhydride is typical of acid anhydrides resulting from molecular condensation of these fatty acids.

In formula (7), $R^6$ is a saturated or unsaturated, substituted or unsubstituted, polyvalent hydrocarbon group having 1 to 30 carbon atoms, preferably 2 to 10 carbon atoms and p is an integer of 1 to 3. Examples of the acid anhydride of formula (7) include maleic anhydride and phthalic anhydride.

Additive (D) is preferably blended in an amount of about 0.01 to 5 parts, more preferably about 0.1 to 1 part by weight per 100 parts by weight of components (A) to (C) combined although the amount of additive (D) is not particularly limited.

The conductive silicone rubber composition of the present invention contains components (A) to (D) as essential components and may further contain (E) an organic silicon compound having at least one ≡SiH bond in a molecule for the purpose of improving the surface tack of the composition after HAV.

The organic silicon compounds used herein are often linear or cyclic and may contain a minor proportion of a branched chain structure or three-dimensional structure. Exemplary are methylhydrogenpolysiloxanes terminated with a trialkylsilyl group and having a varying degree of polymerization, organopentasiloxane represented by Si[OSi(CH$_3$)$_2$H]$_4$, siloxane copolymers comprised of SiO$_2$ and (CH$_3$)$_2$HSiO$_{\frac{1}{2}}$ units, co-polymers of methylhydrogenpolysiloxane and dialkylsiloxane, polysilylalkylenesiloxane having a SiH bond, polysilanes, and polycarbosilanes.

The organic silicon compound (E) is blended in an amount of 0 to about 10 parts, preferably about 0.05 to 10 parts, more preferably about 0.5 to 5 parts by weight per 100 parts by weight of component (A). Less than 0.05 parts of the organic silicon compound would not be effective for its purpose whereas more than 10 parts would sometimes adversely affect the heat resistance and other physical properties of cured products.

The composition of the invention may be prepared by uniformly mixing predetermined amounts of essential components (A) to (D) and optional component (E). Although the order of addition of these components is not critical, it is preferred to prepare the composition by first mixing organopolysiloxane (A) with conductive carbon black (B), adding organic peroxide (C) and component (D) to the mixture, and finally adding component (E), if desired, while kneading or milling the mixture at respective stages in a Banbury mixer or roll mill.

If desired, any of additives commonly used in conventional silicone rubber compositions may be added to the composition of the present invention. Such additives include dispersants such as low molecular weight siloxanes having a degree of polymerization of up to 100, silanol-containing silane, and alkoxy-containing silanes; heat resistance modifiers such as iron oxide, cerium oxide, and iron octylate; pigments; and reinforcing fillers in the form of silica fine powder such as fumed silica and wet silica which may or may not be surface treated to be hydrophobic, ground quartz, diatomaceous earth. Also useful are saturated aliphatic hydro-carbons such as isoparaffin solvent for imparting processability and moldability to the composition; mold release agents such as fatty acid metal salts and fatty acid amides; blowing agents such as azodicarbonamide and azobisisobutyronitrile; and other well-known additives used in conventional silicone rubber compositions.

The thus prepared conductive silicone rubber composition of the present invention may be molded by any desired technique such as compression molding, injection molding, and calendering techniques and vulcanized by an atmospheric hot air vulcanization (HAV) technique whereby the composition is converted into an elastomer. Vulcanization is generally carried out with hot air at temperatures of 100 to 500° C. for 5 seconds to 10 minutes although vulcanization may be accomplished even at lower temperatures if the time is extended. Also the HAV technique may be modified by combining hot air with heating by infrared heaters or with UHF heating by taking advantage of the increased UHF absorption of the composition due to carbon black blended therein.

In this way, the composition is molded and cured into a conductive silicone rubber which is a void-free, surface tack-free, heat resistant elastomer. Therefore, the conductive silicone rubber composition of the invention is advantageously used for the manufacture of EMI shielding gaskets, building gaskets, conductive roll members such as charging rolls, transfer rolls, developing rolls, paper feed rolls, and fixing rolls, and the like.

EXAMPLE

Examples of the present invention are given below by way of illustration and not by way of limitation. All parts are by weight and the viscosity is measured at 25° C.

EXAMPLES 1-3 & Comparative Example

Several silicone rubber compositions were prepared by kneading 100 parts of an organopolysiloxane comprised of 99.7 mol % of dimethylsiloxane units and 0.275 mol % of methylvinylsiloxane units, blocked with 0.025 mol % of a dimethylvinylsilyl group at either end of its molecular chain, and having a viscosity of $1 \times 10^7$ cs, 40 parts of acetylene black, and 1 part of cerium oxide in a pressure kneader to form a base compound, and then adding amounts of an organic peroxide and an additive to 100 parts of the base compound as shown in Table 1.

These compositions were then measured for plasticity in accordance with JIS C-2123. Each of the compositions was shaped into a sheet which was covered with a polyethylene sheet and allowed to stand for 1 and 3 days at room temperature before the sheet was similarly measured for plasticity and examined for workability by an extrusion test.

Separately, each of the silicone rubber compositions was extruded into a rod of 5 mm in diameter by means of an extruder having a diameter of 40 mm and passed through a HAV tower having a height of about 1 m at a temperature of 250° C., thereby accomplishing HAV within a residence time of 5 minutes.

The resulting conductive silicone rubbers were examined for surface tack, hardness (JIS A scale), tensile strength and elongation in accordance with JIS K-6301.

The results are shown in Table 1.

TABLE 1

| | Example | | | Comparative Example |
|---|---|---|---|---|
| | 1 | 2 | 3 | |
| Composition | | | | |
| Base compound | 100 | 100 | 100 | 100 |
| Organic peroxide* | 1.5 | 1.5 | 1.5 | 1.5 |
| Additive | | | | |
| Stearic acid | 0.1 | — | — | — |
| Acetic anhydride | — | 0.5 | — | — |
| Maleic anhydride | — | — | 0.5 | — |
| Compound's plasticity (JIS C-2133) | | | | |
| Initial | 250 | 253 | 247 | 250 |
| 1 day | 270 | 280 | 310 | 420 |
| 3 days | 310 | 350 | 430 | 700 |
| Extrusion molding | extrudable after 3 days | extrudable after 3 days | extrudable after 3 days | extrudable after 3 days |
| Physical properties | | | | |
| Surface tack | none | none | none | none |
| Hardness (JIS A) | 61 | 59 | 58 | 60 |
| Tensile strength (kgf/cm$^2$) | 50 | 46 | 52 | 48 |
| Elongation (%) | 270 | 280 | 250 | 280 |

*organic peroxide

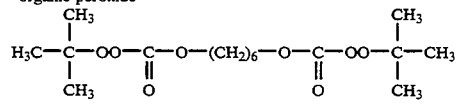

As is evident from Table 1, the compositions having stearic acid, acetic anhydride and maleic anhydride added thereto within the scope of the present invention (Examples 1-3) maintained constant plasticity, experienced no scorching and remained well workable over a long term as compared with the composition free of such a specific additive (Comparative Example). The cured products of Examples 1-3 had physical properties equivalent to those of the additive-free composition (Comparative Example).

There has been described a conductive silicone rubber composition which allows for HAV with the aid of an organic peroxide irrespective of the inclusion of carbon black and is significantly improved in shelf stability. The conductive silicone rubber resulting therefrom is free of voids or surface tack and has improved heat resistance and conductivity so that it is suitable in a variety of uses.

Although some preferred embodiments have been described, many modifications and variations may be made thereto in the light of the above teachings. It is therefore to be understood that within the scope of the appended claims, the invention may be practiced otherwise than as specifically described.

We claim:

1. A conductive silicone rubber composition comprising
   (A) an organopolysiloxane of the formula (1);

$$R^1_a SiO_{(4-a)/2} \tag{1}$$

wherein $R^1$ is independently selected from substituted or unsubstituted monovalent hydrocarbon groups and letter a is a positive number of 1.90 to 2.05,
   (B) conductive carbon black,
   (C) an organic peroxide of the formula (2):

$$R^2-OO-\underset{\underset{O}{\|}}{C}-O-X-O-\underset{\underset{O}{\|}}{C}-OO-R^3 \tag{2}$$

wherein X is formula (4):

$$-CH_2-\underset{\underset{CH_3}{|}}{\overset{\overset{CH_3}{|}}{C}}-CH_2- \tag{4}$$

$R^2$ and $R^3$ each are a monovalent hydrocarbon group having 3 to 10 carbon atoms or a group of the following formula (5):

$$-SiR_3^4 \tag{5}$$

wherein $R^4$ is a methyl, ethyl or phenyl group, and
   (D) at least one additive selected from the group consisting of formic acid, a fatty acid of the general formula (6):

$$R^5(COOH)_m \tag{6}$$

wherein $R^5$ is a saturated or unsaturated, substituted or unsubstituted, monovalent hydrocarbon group having 1 to 30 carbon atoms and m is an integer of 1 to 10, an acid anhydride resulting from molecular condensation of the fatty acid, or an acid anhydride of the formula (7):

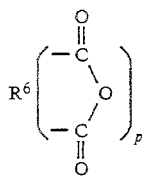

(7)

wherein $R^6$ is a saturated or unsaturated, substituted or unsubstituted, polyvalent hydrocarbon group having 1 to 30 carbon atoms and p is an integer of 1 to 3.

2. The composition of claim 1 which contains
   100 parts by weight of organopolysiloxane (A),
   about 5 to about 100 parts by weight of carbon black (B), and
   about 0.1 to about 5 parts by weight of organic peroxide (C).

3. The composition of claim 2 which contains about 0.01 to about 5 parts by weight of additive (D) per 100 parts by weight of components (A) to (C) combined.

4. A conductive silicone rubber obtained by curing the composition of claim 1.

5. The conductive silicone rubber of claim 4 wherein the composition is cured by atmospheric hot air vulcanization or UHF-assisted vulcanization.

6. The composition of claim 1 wherein the monovalent hydrocarbon group, $R^1$, is an alkyl group alkenyl group, phenyl group or tolyl group, each optionally substituted with halogen or cyano groups.

7. The composition of claim 1 wherein the electroconductive carbon black is acetylene black, conducting furnace black, super conducting furnace black, extra conducting furnace black, conducting channel black, furnace black or channel black heat treated at a temperature of about 1500° C., or mixtures thereof.

8. The composition of claim 1 which further comprises: (E) an organic silicon compound having at least one $\equiv$SiH bond in a molecule.

9. The composition of claim 1 wherein component (D) is stearic acid, acetic anhydride or maleic anhydride.

10. The composition of claim 1, wherein component (D) is acetic anhydride or maleic anhydride.

11. A conductive silicone rubber composition comprising
    (A) an organopolysiloxane of the formula (1);

$$R^1_a SiO_{(4-a)/2} \tag{1}$$

wherein $R^1$ is independently selected from substituted or unsubstituted monovalent hydrocarbon groups and letter a is a positive number of 1.90 to 2.05,
    (B) conductive carbon black,
    (C) an organic peroxide of the formula (2):

$$R^2-OO-\underset{\underset{O}{\|}}{C}-O-X-O-\underset{\underset{O}{\|}}{C}-OO-R^3 \tag{2}$$

wherein X is a group of the following formula (3) or (4):

$$-(CH_2)_n- \tag{3}$$

$$-CH_2-\underset{\underset{CH_3}{|}}{\overset{\overset{CH_3}{|}}{C}}-CH_2- \tag{4}$$

wherein n is an integer of 2 to 8,
    $R^2$ and $R^3$ each are a monovalent hydrocarbon group having 3 to 10 carbon atoms or a group of the following formula (5):

$$-SiR_3^4 \tag{5}$$

wherein $R^4$ is a methyl, ethyl or phenyl group, and
    (D) at least one additive which is an acid anhydride resulting from molecular condensation of formic acid or a fatty acid of the formula (6):

$$R^5(COOH)_m \tag{6}$$

wherein $R^5$ is a saturated or unsaturated, substituted or unsubstituted, monovalent hydrocarbon group having 1 to 30 carbon atoms and m is an integer of 1 to 10, or an acid anhydride of the formula (7):

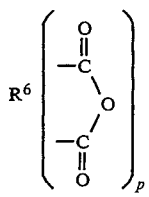 (7)

wherein $R^6$ is a saturated or unsaturated, substituted or unsubstituted, polyvalent hydrocarbon group having 1 to 30 carbon atoms and p is an integer of 1 to 3.

12. The composition of claim 11 which contains
   100 parts by weight of organopolysiloxane (A),
   about 5 to about 100 parts by weight of carbon black (B), and
   about 0.1 to about 5 parts by weight of organic peroxide (C).

13. The composition of claim 12, which contains about 0.01 to about 5 parts by weight of additive (D) per 100 parts by weight of components (A) to (C) combined.

14. A conductive silicone rubber obtained by curing the composition of claim 11.

15. The conductive silicone rubber of claim 14, wherein the composition is cured by atmospheric hot air vulcanization or UHF-assisted vulcanization.

16. The composition of claim 11, wherein the monovalent hydrocarbon group, $R^1$, is an alkyl group, alkenyl group, phenyl group or tolyl group, each optionally substituted with halogen or cyano groups.

17. The composition of claim 11, wherein the electroconductive carbon black is acetylene black, conducting furnace black, super conducting furnace black, extra conducting furnace black, conducting channel black, furnace black or channel black heat treated at a temperature of about 1500° C., or mixtures thereof.

18. The composition of claim 11 which further comprises: (E) an organic silicon compound having at least one $\equiv$SiH bond in a molecule.

* * * * *